United States Patent
Lu et al.

(10) Patent No.: US 9,288,084 B1
(45) Date of Patent: Mar. 15, 2016

(54) SOFT DECISION ASSISTED EQUALIZER ADAPTATION

(71) Applicant: LSI Corporation, San Jose, CA (US)

(72) Inventors: Lu Lu, San Jose, CA (US); Haitao Xia, San Jose, CA (US); Haotian Zhang, Longmont, CO (US); Jianzhong Huang, San Jose, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/259,338

(22) Filed: Apr. 23, 2014

Related U.S. Application Data

(60) Provisional application No. 61/981,884, filed on Apr. 21, 2014.

(51) Int. Cl.
| | |
|---|---|
| G11B 5/035 | (2006.01) |
| G11B 20/10 | (2006.01) |
| H04L 25/03 | (2006.01) |
| H04L 27/01 | (2006.01) |
| G11B 5/09 | (2006.01) |

(52) U.S. Cl.
CPC .... *H04L 25/03006* (2013.01); *G11B 20/10046* (2013.01); *H04L 27/01* (2013.01); *H04L 2025/03592* (2013.01)

(58) Field of Classification Search
CPC .............. G11B 5/035; G11B 20/1217; G11B 20/10009; G11B 5/09; G11B 2220/90; G06F 11/10
USPC ................. 360/65, 39, 48; 714/33; 375/229
See application file for complete search history.

(56) References Cited

U.S. PATENT DOCUMENTS 7,864,466 B2 * 1/2011 Esumi et al. .................... 360/39

* cited by examiner

*Primary Examiner* — Nabil Hindi
(74) *Attorney, Agent, or Firm* — Hamilton DeSanctis & Cha

(57) ABSTRACT

A data processing system includes an equalizer circuit operable to equalize digital data according to tap coefficients to yield equalized data, a tap coefficient adaptation circuit operable to adapt the tap coefficients based at least in part on a scaled error signal, a data detector operable to apply a data detection algorithm to the digital data to generate hard decisions and soft decisions, an error calculation circuit operable to calculate an error signal based on the equalized data and on the hard decisions, and a scaling circuit operable to scale the error signal based on the soft decisions to yield the scaled error signal.

20 Claims, 3 Drawing Sheets

SOFT DECISION ASSISTED EQUALIZER ADAPTATION

CROSS REFERENCE TO RELATED APPLICATIONS

The present application claims priority to (is a non-provisional of) U.S. Pat. App. No. 61/981,884, entitled "Soft Decision Assisted Equalizer Adaptation", and filed Apr. 21, 2014 by Lu et al, the entirety of which is incorporated herein by reference for all purposes.

FIELD OF THE INVENTION

Various embodiments of the present invention provide systems and methods for data processing, and more particularly systems and methods for equalizer adaptation based on detector soft decisions.

BACKGROUND

Various data processing systems have been developed including storage systems, cellular telephone systems, and radio transmission systems. In such systems data is transferred from a sender to a receiver via some medium. For example, in a storage system, data is sent from a sender (i.e., a write function) to a receiver (i.e., a read function) via a storage medium. As information is stored and transmitted in the form of digital data, errors are introduced that, if not corrected, can corrupt the data and render the information unusable. The effectiveness of any transfer is impacted by any losses in data caused by various factors. For example, as the recording density of magnetic disk drives increases, the noise, jitter and distortion increases, making it more difficult to recover the original data.

SUMMARY

Various embodiments of the present invention provide systems and methods for data processing, and more particularly systems and methods for equalizer adaptation based on detector soft decisions.

A data processing system is disclosed including an equalizer circuit operable to equalize digital data according to tap coefficients to yield equalized data, a tap coefficient adaptation circuit operable to adapt the tap coefficients based at least in part on a scaled error signal, a data detector operable to apply a data detection algorithm to the digital data to generate hard decisions and soft decisions, an error calculation circuit operable to calculate an error signal based on the equalized data and on the hard decisions, and a scaling circuit operable to scale the error signal based on the soft decisions to yield the scaled error signal.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

Various embodiments of the present invention provide data processing systems with soft decision assisted equalizer adaptation. The data processing systems include an equalizer, a digital finite impulse response (DFIR) filter that is controlled by tap coefficients adapted based on soft decisions from a data detector. The digital finite impulse response filter equalizes digital samples from an analog to digital converter, compensating for inter-symbol interference resulting from data being transmitted at high speed through band-limited channels.

In some embodiments, the data processing system includes a backend digital finite impulse response filter, data detector and decoder to determine the correct value of data retrieved from storage or received from a transmission medium, as well as a feedback loop with a loop data detector that yields hard decisions about the correct value of data retrieved from storage or received from a transmission medium. The feedback loop controls various components in the data processing system based on the hard decisions from the loop data detector. In general, the backend portion of the system has higher latency and more reliably detects the correct data values, while the feedback loop portion of the system has a lower latency for faster control but with less reliable results. The soft decision assisted equalizer adaptation disclosed herein computes the filter tap coefficients for the backend digital finite impulse response filter based on hard decisions from the loop data detector, but also bases the computation of the filter tap coefficients on soft decisions or soft information provided by the loop data detector about the reliability of the hard decisions. If the loop soft decisions indicate that the loop hard decisions are less likely to be correct, changes to the filter tap coefficients are made more slowly to avoid relying on possibly incorrect hard decisions.

By selecting tap coefficients for the backend digital finite impulse response filter based on soft decisions from the loop detector, the equalization process is better able to suppress noise, jitter and distortion, enabling the data processing system to better detect the correct values of the retrieved data.

Figure 1:
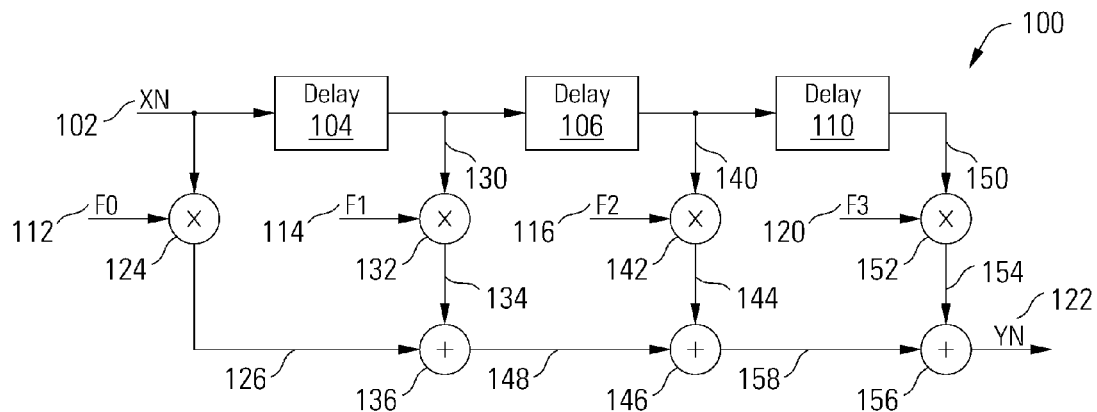
FIG. 1 depicts a digital finite impulse response (DFIR) filter that is configured with soft decision based tap coefficients in accordance with one or more embodiments of the present invention.

Turning to FIG. 1, a digital finite impulse response filter 100 is depicted that is controlled with soft decision based tap coefficients in accordance with one or more embodiments of the present invention. The digital finite impulse response filter 100 passes an input 102 through a series of delay elements 104, 106 and 110, multiplying the delayed signals by filter coefficients or tap weights 112, 114, 116 and 120, and summing the results to yield a filtered output 122. The outputs 130, 140 and 150 of each delay element 104, 106 and 110 and the input 102 form a tapped delay line and are referred to as taps. The number of delay elements 104, 106 and 110, and thus the number of taps 102, 130, 140 and 150 (also referred to as the order or length of the digital finite impulse response filter 100) may be increased to more finely tune the frequency response, but at the cost of increasing complexity. The digital finite impulse response filter 100 implements a filtering equation such as $Y[n]=F0X[n]+F1X[n-1]+F2X[n-2]+F3X[n-3]$ for the three-delay filter illustrated in FIG. 1, or more generally $Y[n]=F0X[n]+F1X[n-1]+F2X[n-2]+ \ldots +FLX[n-L]$, where $X[n]$ is the current input 102, the value subtracted from n represents the index or delay applied to each term, Fi are the tap weights 112, 114, 116 and 120, $Y[n]$ is the output 122 and L is the filter order. The input 102 is multiplied by tap weight 112 in a multiplier 124, yielding a first output term 126. The second tap 130 is multiplied by tap weight 114 in multiplier 132, yielding a second output term 134, which is combined with first output term 126 in an adder 136 to yield a first sum 148. The third tap 140 is multiplied by tap weight 116 in multiplier 142, yielding a third output term 144, which is combined with first sum 148 in adder 146 to yield a second sum 158. The fourth tap 150 is multiplied by tap weight 120 in multiplier 152, yielding a fourth output term 154, which is combined with second sum 158 in adder 156 to yield output 122. By changing the tap weights 112, 114, 116 and 120, the filtering applied to the input 102 by the digital finite impulse response filter 100 is adjusted to select the desired pass frequencies and stop frequencies. The soft decision assisted equalizer adaptation is not limited to any particular filter circuit, and based upon the disclosure provided herein, one of ordinary skill in the art will recognize a variety of filter circuits that may be used with soft decision assisted adaptation.

Figure 2:
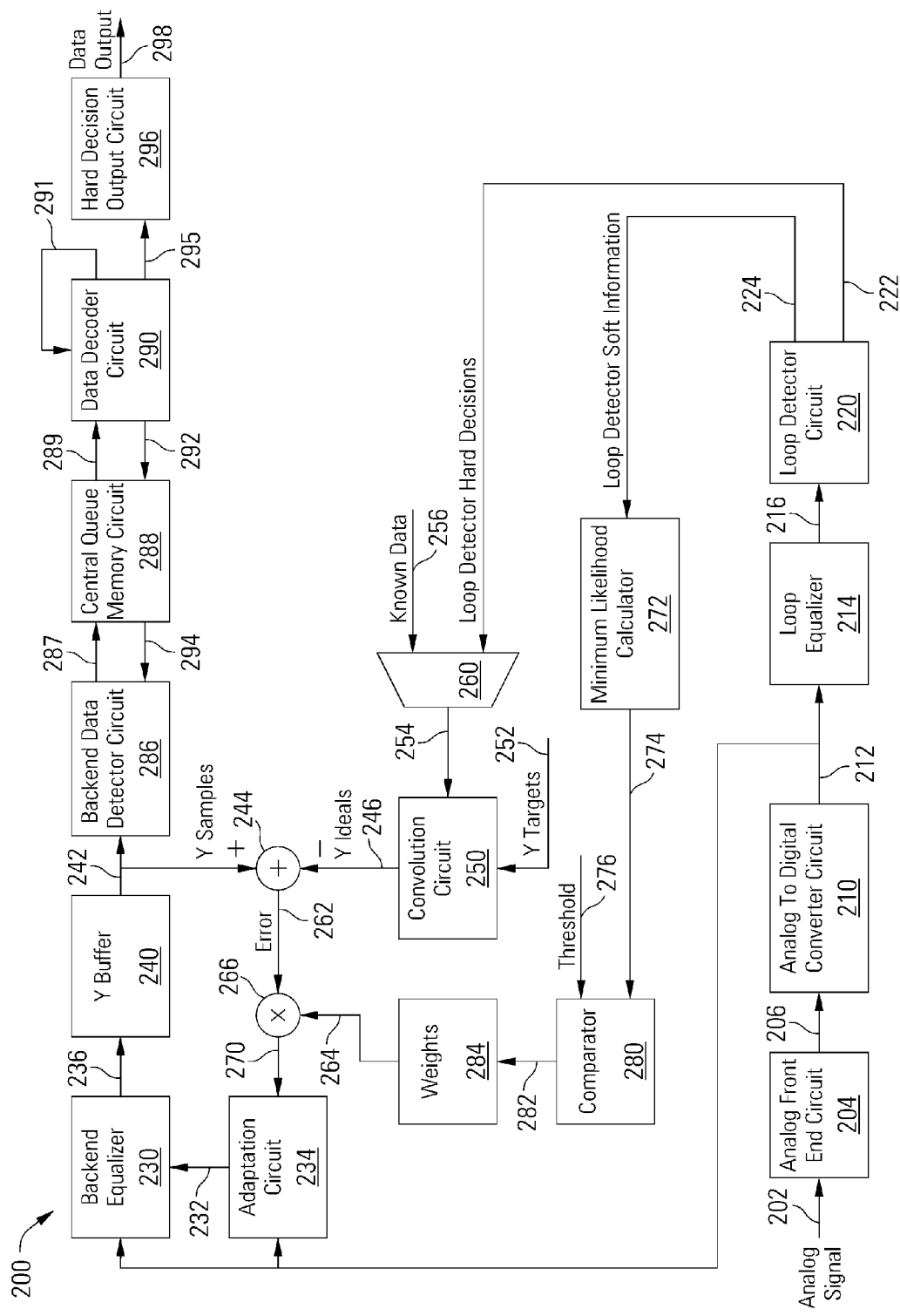
FIG. 2 depicts a block diagram of a data processing system with soft decision based equalization adaptation in accordance with one or more embodiments of the present invention.

Turning to FIG. 2, a data processing system with soft decision assisted equalizer adaptation 200 is depicted in accordance with one or more embodiments of the present invention. The data processing system 200 is used to process analog signal 202 and to retrieve user data bits from the analog signal 202 without errors. In some cases, analog signal 202 is derived from a read/write head assembly in a magnetic storage medium. In other cases, analog signal 202 is derived from a receiver circuit that is operable to receive a signal from a transmission medium. The transmission medium may be wireless or wired such as, but not limited to, cable or optical connectivity. Based upon the disclosure provided herein, one of ordinary skill in the art will recognize a variety of sources from which analog signal 202 may be derived.

The data processing system 200 includes an analog front end 204 that receives and processes the analog signal 202. Analog front end 204 may include, but is not limited to, an analog filter and an amplifier circuit as are known in the art. Based upon the disclosure provided herein, one of ordinary skill in the art will recognize a variety of circuitry that may be included as part of analog front end 204. In some cases, the gain of a variable gain amplifier included as part of analog front end 204 may be modifiable, and the cutoff frequency and boost of an analog filter included in analog front end 204 may be modifiable. Analog front end 204 receives and processes the analog signal 202, and provides a processed analog signal 206 to an analog to digital converter 210.

Analog to digital converter 210 converts processed analog signal 206 into a corresponding series of digital samples 212. Analog to digital converter 210 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 212 are provided to a loop equalizer 214. Loop equalizer 214 applies an equalization algorithm to digital samples 212 to yield an equalized output 216. In some embodiments of the present invention, loop equalizer 214 is a digital finite impulse response filter circuit as is known in the art.

A loop data detector 220 performs a data detection process on the equalized output 216. In some embodiments of the present invention, loop data detector 220 is a Soft Output Viterbi Algorithm (SOVA) data detector circuit, or a Maximum a Posteriori (MAP) data detector circuit as are known in the art. The loop data detector 220 yields hard decisions 222 representing the most likely value of each bit or symbol in equalized output 216. The loop data detector 220 also yields soft information or soft decisions 224 that each bit or symbol has a particular value, or in other words, the likelihood that the hard decisions 222 are correct. In some embodiments, the soft decisions 224 are generated as log likelihood ratio soft information. Based upon the disclosure provided herein, one of ordinary skill in the art will recognize a variety of loop data detectors that may be used in relation to different embodiments of the present invention.

The digital samples 212 are also provided to a backend equalizer 230. Backend equalizer 230 applies an equalization algorithm to digital samples 212 to yield an equalized output 236. In some embodiments of the present invention, backend equalizer 230 is a digital finite impulse response filter circuit as is known in the art. The backend equalizer 230 is configured by filter tap coefficients 232 which are adapted based in part on the loop detector soft decisions 224 as will be described in more detail below.

The equalized output 236 from backend equalizer 230 is stored in a Y buffer 240. When a backend data detector circuit 286 is available for processing, stored equalized data 242 from Y buffer 240 is retrieved by backend data detector circuit 286. The backend data detector circuit 286 applies a data detection algorithm to stored equalized data 242 to yield detected output 287. In some embodiments, the data detection algorithm may be but is not limited to, a Soft Output Viterbi Algorithm (SOVA), or a Maximum a Posteriori detection algorithm as are known in the art. Based upon the disclosure provided herein, one of ordinary skill in the art will recognize a variety of data detection algorithms that may be used in relation to different embodiments of the present invention. Data detector circuit 286 may provide both hard decisions and soft decisions.

Detected output 287 is provided to a central queue memory circuit 288 that operates to buffer data passed between data detector circuit 286 and data decoder circuit 290. When data decoder circuit 290 is available, data decoder circuit 290 receives detected output 287 from central queue memory 288 as a decoder input 289. Data decoder circuit 290 applies a data decoding algorithm to decoder input 289 in an attempt to recover originally written data. The result of the data decoding algorithm is provided as a decoded output 292. Similar to detected output 287, decoded output 292 may include both hard decisions and soft decisions. Data decoder circuit 290 may be any data decoder circuit known in the art that is capable of applying a decoding algorithm to a received input. Data decoder circuit 290 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 290 provides the result of the data decoding algorithm as a data output 295. Data output 295 is provided to a hard decision output circuit 296 where the data is reordered before providing a series of ordered data sets as a data output 298.

One or more iterations through the combination of data detector circuit 286 and data decoder circuit 290 may be made in an effort to converge on the originally written data set. Processing through both the data detector circuit 286 and the data decoder circuit 290 is referred to as a "global iteration". For the first global iteration, data detector circuit 286 applies the data detection algorithm without guidance from a decoded output. For subsequent global iterations, data detector circuit 286 applies the data detection algorithm to equalized data 242 as guided by decoded output 292. Decoded output 292 is received from central queue memory 288 as a detector input 294.

During each global iteration it is possible for data decoder circuit 290 to make one or more local iterations including application of the data decoding algorithm to decoder input 289. For the first local iteration, data decoder circuit 290 applies the data decoder algorithm without guidance from a decoded output 291. For subsequent local iterations, data decoder circuit 290 applies the data decoding algorithm to decoder input 289 as guided by a previous decoded output 291.

The filter tap coefficients 232 that configure backend equalizer 230 are adapted based in part on the soft decisions 224 from loop data detector 220. A convolution circuit 250 convolves Y targets 252, such as, but not limited to, a three element partial response target, with loop detector hard decisions 222 or known data 256. A multiplexer 260 can be used to select between the loop detector hard decisions 222 or known data 256 as the input 254 to the convolution circuit 250. The convolution circuit 250 can be any circuit known in the art that is capable of applying target based filtering to an input signal 254 to yield a Y ideals output 246 conformed to the partial response target 252. Based upon the disclosure provided herein, one of ordinary skill in the art will recognize a variety of convolution circuits that may be used in relation to different embodiments of the present invention.

The Y ideals output 246 from convolution circuit 250 is subtracted from the Y samples 242 generated by backend equalizer 230 and stored in Y buffer 240, yielding an error signal 262. The Y ideals 246 and Y samples 244 are aligned in any suitable manner before subtracting Y ideals 246 from Y samples 242 in subtraction circuit 244, for example by retrieving Y samples 242 from Y buffer 240 when corresponding Y ideals 246 are available from convolution circuit 250.

The error signal 262 is scaled in multiplier 266 by weights 264, yielding a scaled error signal 270. An adaptation circuit 234 computes filter tap coefficients 232 for the backend equalizer 230 based on the scaled error signal 270 and on the digital samples 212 from analog to digital converter 210. The adaptation circuit 234 is operable to generate new filter tap coefficients 232 for backend equalizer 230 that reduce the difference between the Y ideals 246 and the Y samples 242, using any suitable algorithm. For example, the adaptation circuit 234 can implement a least mean squares algorithm to find filter tap coefficients 232 using the least mean squares of the scaled error signal 270 based on the difference between the ideal equalized sample (Y ideals 246) and the equalized output (Y samples 242). However, the adaptation circuit 234 is not limited to any particular error reducing algorithm. Based upon the disclosure provided herein, one of ordinary skill in the art will recognize a variety of adaptation circuits that may be used in relation to different embodiments of the present invention. The new filter tap coefficients 232 thus tune the backend equalizer 230 to better adapt to the channel condition (noise, jitter, distortion, etc.).

The weights 264 are provided by a weights circuit 284, selected based on the loop detector soft decisions 224. As the soft decisions 224 for each bit or symbol are output from the loop detector circuit 220, a minimum likelihood calculator 272 finds the minimum likelihood of the current bit or symbol, the previous bit or symbol and the next bit or symbol. For example, in an embodiment in which soft decisions 224 are log likelihood ratio (LLR) values, the minimum likelihood calculator 272 yields the minimum of the three log likelihood ratio values for the current, previous and next bit or symbol, or min(abs(LLR−1), abs(LLR), abs(LLR+1)). The minimum likelihood calculator 272 can include any suitable circuit for finding the lowest of three successive likelihood inputs, such as, but not limited to, a shift register or other memory and a comparator. Based upon the disclosure provided herein, one of ordinary skill in the art will recognize a variety of minimum likelihood circuits that may be used in relation to different embodiments of the present invention.

A comparator 280 compares the minimum likelihood 274 from the minimum likelihood calculator 272 with a threshold 276, yielding an indicator 282 of whether the minimum likelihood 274 is less than the threshold 276. If the minimum likelihood 274 is less than the threshold 276, meaning that one of the corresponding three successive hard decisions may be erroneous, the weights circuit 284 outputs a lower weight 264. The error signal 262 will be scaled down by the lower weight 264 in multiplier 266, so that the adaptation circuit 234 will react less to the scaled error signal 270 and the filter tap coefficients 232 will be less affected by the possibly erroneous hard decisions 222. The value of the weight 264 supplied by the weights circuit 284 can be chosen differently for different channel conditions. For example, the weight 264 is selected in some embodiments to be 0, ⅛, ¼, ½ or 1. In some embodiments, the weight 264 can be selected based on the likelihood value, scaling the error signal 262 down more the lower the likelihood reported by the soft decisions 224.

The convolution circuit 250 and subtraction circuit 244 are also referred to herein as an error calculation circuit. The minimum likelihood calculator 272, comparator 280, weights circuit 284 and multiplier are also referred to herein as a scaling circuit.

Figure 3:
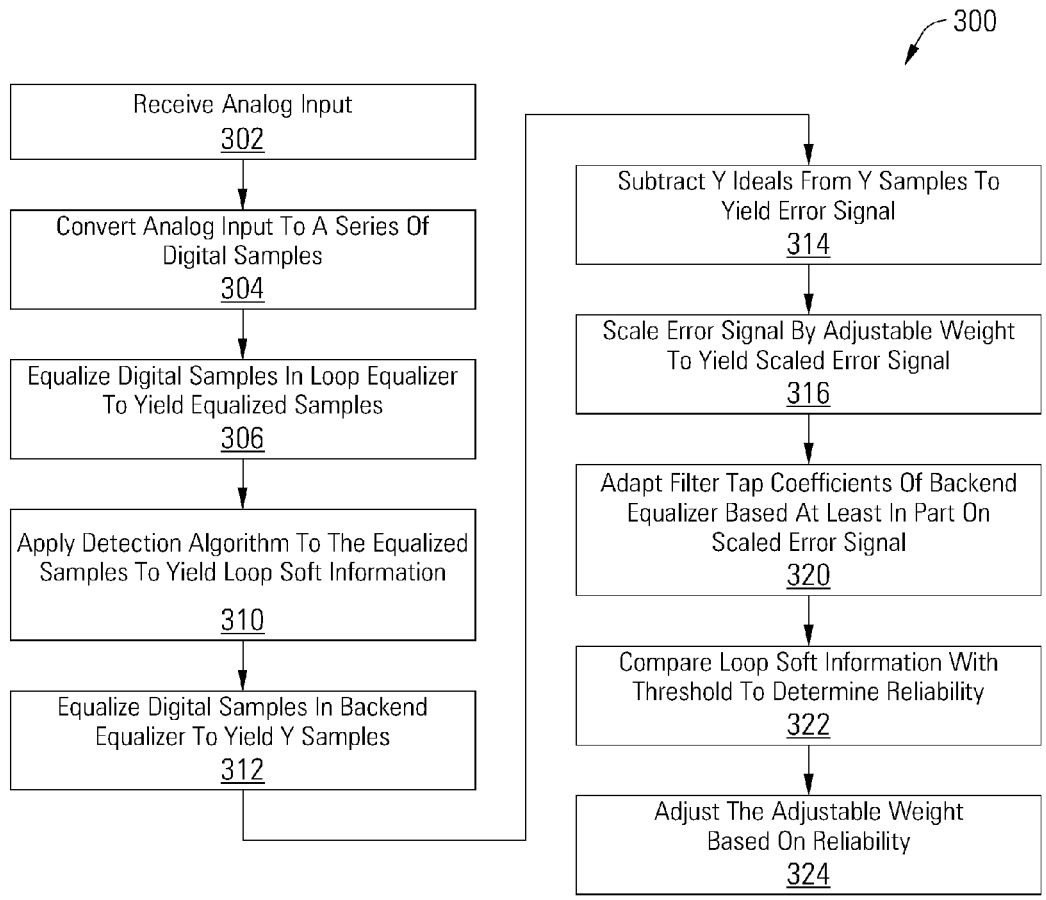
FIG. 3 depicts a flow diagram showing a method for soft decision assisted equalizer adaptation in accordance with one or more embodiments of the present invention.

Turning now to FIG. 3, a flow diagram 300 depicts a method for data processing including soft decision assisted equalizer adaptation in accordance with some embodiments of the present invention. The method of FIG. 3, or variations thereof, may be performed in data processing systems such as that illustrated in FIG. 2. Following flow diagram 300, an analog input is received (block 302). In some cases, the analog input is derived from a read/write head assembly in a magnetic storage medium. In other cases, the analog input is derived from a receiver circuit that is operable to receive a signal from a transmission medium. The transmission medium may be wireless or wired such as, but not limited to, cable or optical connectivity. Based upon the disclosure provided herein, one of ordinary skill in the art will recognize a variety of sources from which the analog input may be derived.

The analog input is converted to a series of digital samples (block 304). The digital samples are equalized to yield equalized samples (block 306). The equalization of the digital samples is performed in some embodiments using an equalizer or digital finite impulse response filter in a feedback loop. A loop detection algorithm is applied to the equalized samples to yield soft information or soft decisions representing the likelihood that each bit or symbol in the equalized samples has a particular value (block 310). The digital samples are also equalized in a backend equalizer with coefficients adapted based in part on the soft decisions to yield Y samples (block 312). Y ideals, or ideal values of the Y samples, are subtracted from the Y samples to yield an error signal (block 314). The Y ideals are computed in some embodiments by convolving hard decisions from the loop detection algorithm with a partial response target. In some other embodiments, the Y ideals are computed by convolving known data with the partial response target.

The error signal is scaled by an adjustable weight to yield a scaled error signal (block 316). The filter tap coefficients of the backend equalizer are adapted based at least in part on the scaled error signal (block 320). The adjustable weight is computed by comparing the loop soft decisions with at least one threshold to determine their reliability (block 322), and adjusting the adjustable weight based on their reliability (block 324). For example, if the loop soft decisions have a reliability greater than the threshold, the adjustable weight is higher to more quickly adjust the filter tap coefficients of the backend equalizer based on the scaled error signal. If the loop soft decisions have a reliability lower than the threshold, the adjustable weight is lower to more slowly adjust the filter tap coefficients of the backend equalizer based on the scaled error signal. Thus, less reliable decisions made by the loop detection algorithm have less effect on the filter tap coefficient adaptation, by multiplying the feedback error signal with a scaling weight, while allowing more reliable decisions from the loop detection algorithm to have a faster effect on the filter tap coefficient adaptation.

In some embodiments, the comparison of loop soft decisions with the threshold operates as a gate to enable and disable scaling of equalizer adaptation. If the loop soft decisions have a likelihood under the threshold, then scaling is enabled and the error signal is multiplied by the weight. If the loop soft decisions have a likelihood greater than the threshold, scaling is disabled and the error signal is used to adapt the equalizer tap coefficients without scaling.

In some embodiments, the weight used to scale the error signal is adjustable and varies based on the loop soft decision likelihood value. For example, the weight is selected in some embodiments to be 0, ⅛, ¼, ½ or 1 depending on the likelihood value.

In some embodiments in which the partial response target is based on three bits, the comparison of the loop soft decisions with the threshold is performed by selecting the minimum likelihood value for the current bit, the previous bit and the next bit, and comparing that minimum likelihood value with the threshold. In other words, the lowest likelihood value of the three bits corresponding to the three partial response target values is used in the comparison with the threshold value.

Figure 4:
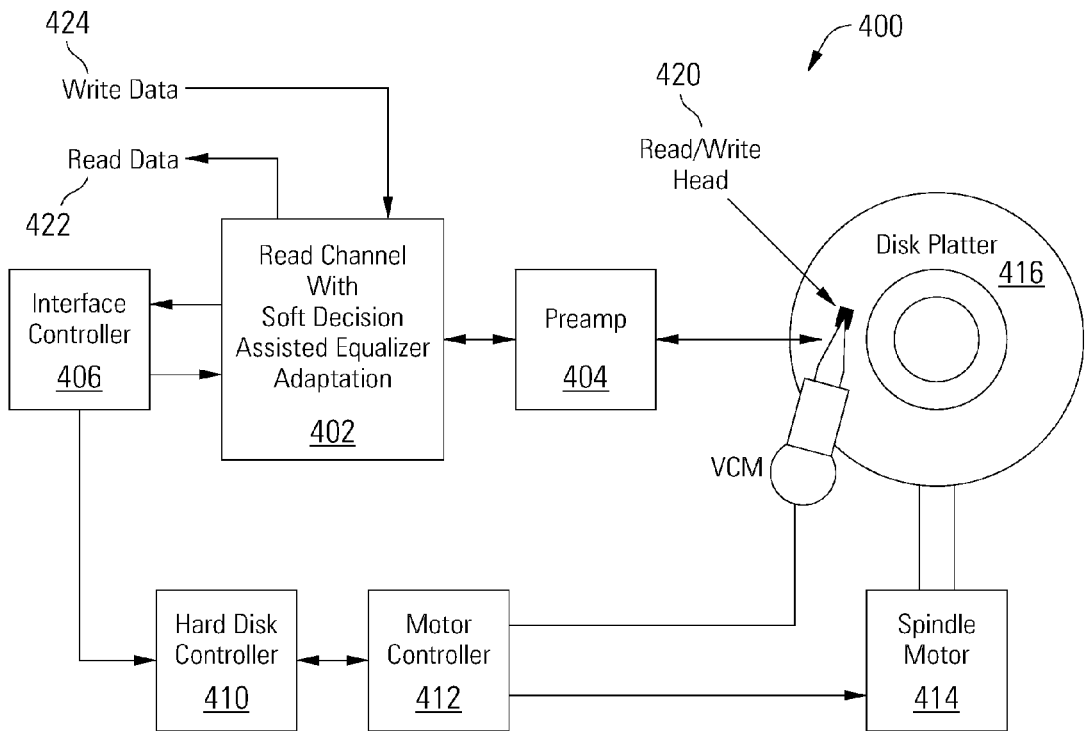
FIG. 4 depicts a storage system including a data processing system with soft decision assisted equalizer adaptation in accordance with one or more embodiments of the present invention.

Turning to FIG. 4, a storage system 400 is illustrated as an example application of a data processing system with soft decision assisted equalizer adaptation in accordance with some embodiments of the present invention. The storage system 400 includes a read channel circuit 402 with a data processing system with soft decision assisted equalizer adaptation in accordance with some embodiments of the present invention. Storage system 400 may be, for example, a hard disk drive. Storage system 400 also includes a preamplifier 404, an interface controller 406, a hard disk controller 410, a motor controller 412, a spindle motor 414, a disk platter 416, and a read/write head assembly 420. Interface controller 406 controls addressing and timing of data to/from disk platter 416. The data on disk platter 416 consists of groups of magnetic signals that may be detected by read/write head assembly 420 when the assembly is properly positioned over disk platter 416. In one embodiment, disk platter 416 includes magnetic signals recorded in accordance with either a longitudinal or a perpendicular recording scheme.

In a typical read operation, read/write head assembly 420 is accurately positioned by motor controller 412 over a desired data track on disk platter 416. Motor controller 412 both positions read/write head assembly 420 in relation to disk platter 416 and drives spindle motor 414 by moving read/write head assembly 420 to the proper data track on disk platter 416 under the direction of hard disk controller 410. Spindle motor 414 spins disk platter 416 at a determined spin rate (RPMs). Once read/write head assembly 420 is positioned adjacent the proper data track, magnetic signals representing data on disk platter 416 are sensed by read/write head assembly 420 as disk platter 416 is rotated by spindle motor 414. The sensed magnetic signals are provided as a continuous, minute analog signal representative of the magnetic data on disk platter 416. This minute analog signal is transferred from read/write head assembly 420 to read channel circuit 402 via preamplifier 404. Preamplifier 404 is operable to amplify the minute analog signals accessed from disk platter 416. In turn, read channel circuit 402 decodes and digitizes the received analog signal to recreate the information originally written to disk platter 416. This data is provided as read data 422 to a receiving circuit. While processing the read data, read channel circuit 402 processes the received signal using a data processing system with soft decision assisted equalizer adaptation. Such a data processing system with soft decision assisted equalizer adaptation can be implemented consistent with the circuits and methods disclosed in FIGS. 2-3. A write operation is substantially the opposite of the preceding read operation with write data 424 being provided to read channel circuit 402. This data is then encoded and written to disk platter 416.

It should be noted that storage system 400 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 400, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

Soft decision assisted equalizer adaptation is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 400 may be modified to include solid state memory that is used to store data in addition to the storage offered by disk platter 416. This solid state memory may be used in parallel to disk platter 416 to provide additional storage. In such a case, the solid state memory receives and provides information directly to read channel circuit 402. Alternatively, the solid state memory may be used as a cache where it offers faster access time than that offered by disk platter 416. In such a case, the solid state memory may be disposed between interface controller 406 and read channel circuit 402 where it operates as a pass-through to disk platter 416 when requested data is not available in the solid state memory or when the solid state memory does not have sufficient storage to hold a newly written data set. Based upon the disclosure provided herein, one of ordinary skill in the art will recognize a variety of storage systems including both disk platter 416 and a solid state memory.

Figure 5:
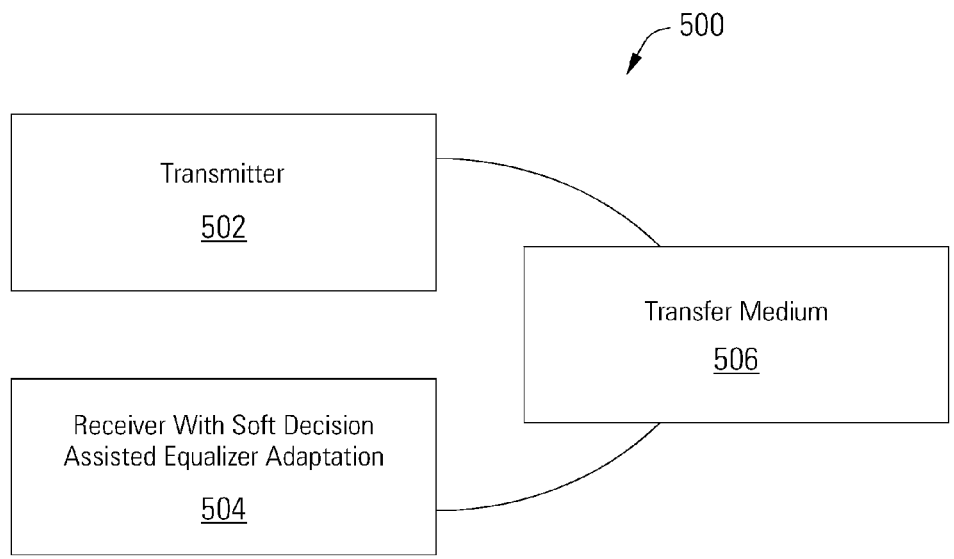
FIG. 5 depicts a wireless communication system including a data processing system with soft decision assisted equalizer adaptation in accordance with one or more embodiments of the present invention.

Turning to FIG. 5, a wireless communication system 500 or data transmission device including a transmitter 502 with a data processing system with soft decision assisted equalizer adaptation is shown in accordance with some embodiments of the present invention. The transmitter 502 is operable to transmit encoded information via a transfer medium 506 as is known in the art. The encoded data is received from transfer medium 506 by receiver 504. Receiver 504 incorporates a data processing system with soft decision assisted equalizer adaptation. Such a data processing system with soft decision assisted equalizer adaptation may be implemented consistent with the circuits and methods disclosed in FIGS. 2-3.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel systems, devices, methods and arrangements for data processing with soft decision assisted equalizer adaptation. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system comprising:
   an equalizer circuit operable to equalize digital data according to tap coefficients to yield equalized data;
   a tap coefficient adaptation circuit operable to adapt the tap coefficients based at least in part on a scaled error signal;
   a data detector operable to apply a data detection algorithm to the digital data to generate hard decisions and soft decisions;
   an error calculation circuit operable to calculate an error signal based on the equalized data and on the hard decisions; and
   a scaling circuit operable to scale the error signal based on the soft decisions to yield the scaled error signal.

2. The data processing system of claim 1, wherein the equalizer circuit comprises a digital finite impulse response filter.

3. The data processing system of claim 1, further comprising a second equalizer circuit operable to equalize the digital data to yield second equalized data, wherein the data detector is operable to apply the data detection algorithm to the second equalized data to generate the hard decisions and the soft decisions.

4. The data processing system of claim 1, wherein the error calculation circuit comprises:
   a convolution circuit operable to convolve the hard decisions with a partial response target to yield ideal digital data; and
   a subtraction circuit operable to subtract the ideal digital data from the equalized data to yield the error signal.

5. The data processing system of claim 1, wherein the scaling circuit comprises a multiplier operable to scale the error signal to yield the scaled error signal based on the soft decisions.

6. The data processing system of claim 5, wherein the scaling circuit further comprises a comparator operable to compare the soft decisions with a threshold.

7. The data processing system of claim 6, wherein the scaling circuit further comprises a weights circuit operable to provide a weight to the multiplier, wherein the multiplier is operable to scale the error signal by the weight, wherein the weight is based on an output of the comparator.

8. The data processing system of claim 6, wherein the scaling circuit further comprises a minimum likelihood calculator operable to provide to the comparator a lowest likelihood value for a plurality of successive ones of the soft decisions.

9. The data processing system of claim 8, wherein the minimum likelihood calculator is operable to output the lowest likelihood value for a same number of successive ones of the soft decisions as a number of elements in a partial response target used by the error calculation circuit.

10. The data processing system of claim 8, wherein the minimum likelihood calculator is operable to output the lowest likelihood value for three successive ones of the soft decisions.

11. The data processing system of claim 1, wherein the soft decisions comprise log likelihood ratio values.

12. The data processing system of claim 1, further comprising a second data detector and a decoder operable to determine correct values of the equalized data.

13. The data processing system of claim 1, wherein the data processing system is incorporated in a storage device.

14. The data processing system of claim 1, wherein the data processing system is incorporated in a data transmission device.

15. A method for processing data comprising:
   applying a data detection algorithm to detect values in digital data, yielding hard decisions and soft decisions;
   equalizing the digital data according to tap coefficients to yield equalized data;
   adapting the tap coefficients based at least in part on a scaled error signal;
   calculating an error signal based on the equalized data and on the hard decisions; and
   scaling the error signal based on the soft decisions to yield the scaled error signal.

16. The method of claim 15, wherein scaling the error signal comprises selecting a weight and multiplying the error signal by the weight to yield the scaled error signal.

17. The method of claim 16, wherein scaling the error signal further comprises identifying a minimum likelihood among a number of successive ones of the soft decisions.

18. The method of claim 17, wherein scaling the error signal further comprises comparing the minimum likelihood with a threshold and selecting the weight based on the comparison.

19. The method of claim 15, wherein calculating the error signal comprises convolving the hard decisions with a partial response target to yield ideal data, and subtracting the ideal data from the equalized data to yield the error signal.

20. A storage system comprising:
   a storage medium maintaining a data set;
   a read/write head assembly operable to provide an analog signal based on the data set on the storage medium;
   an analog to digital converter operable to sample the analog signal to provide digital data;
   an equalizer circuit operable to equalize the digital data according to tap coefficients to yield equalized data;
   a tap coefficient adaptation circuit operable to adapt the tap coefficients based at least in part on a scaled error signal;
   a data detector operable to apply a data detection algorithm to the digital data to generate hard decisions and soft decisions;
   an error calculation circuit operable to calculate an error signal based on the equalized data and on the hard decisions; and
   a scaling circuit operable to scale the error signal based on the soft decisions to yield the scaled error signal.

* * * * *